(12) United States Patent
Elliott et al.

(10) Patent No.: US 10,980,254 B2
(45) Date of Patent: Apr. 20, 2021

(54) EDIBLE ANIMAL CHEWS

(75) Inventors: Matthew Ian Elliott, Normanton (GB); Andrew James Newton, Bradford (GB); Peter Sebastian Slusarczyk, Nolensville, TN (US); Jonathan Christopher Smith, Nashville, TN (US); Vinod Gumudavelli, Franklin, TN (US); Justin Nguyen, Franklin, TN (US)

(73) Assignee: Mars, Incorporated, McLean, VA (US)

( * ) Notice: Subject to any disclaimer, the term of this patent is extended or adjusted under 35 U.S.C. 154(b) by 746 days.

(21) Appl. No.: 14/118,510

(22) PCT Filed: May 18, 2012

(86) PCT No.: PCT/GB2012/000447
§ 371 (c)(1),
(2), (4) Date: Jan. 16, 2014

(87) PCT Pub. No.: WO2012/156674
PCT Pub. Date: Nov. 22, 2012

(65) Prior Publication Data
US 2014/0295052 A1   Oct. 2, 2014

(30) Foreign Application Priority Data

May 18, 2011  (GB) ..................................... 1108384

(51) Int. Cl.
*A23K 50/40*    (2016.01)
*A01K 15/02*    (2006.01)
*A23K 40/25*    (2016.01)

(52) U.S. Cl.
CPC ............ *A23K 50/40* (2016.05); *A01K 15/026* (2013.01); *A23K 40/25* (2016.05)

(58) Field of Classification Search
CPC . A23P 1/12; A23P 30/20; A23K 1/003; A23K 1/143; A23K 1/1846; A23K 1/1853;
(Continued)

(56) References Cited

U.S. PATENT DOCUMENTS

| | | |
|---|---|---|
| 1,788,689 A | 1/1931 | Penza |
| 2,199,825 A | 5/1940 | Kretchmer |

(Continued)

FOREIGN PATENT DOCUMENTS

| | | |
|---|---|---|
| DE | 2545440 A1 | 4/1977 |
| DE | 3818422 A1 | 12/1989 |

(Continued)

OTHER PUBLICATIONS

Frame, "The Technology of Extrusion Cooking", Blackie Academic and Professional, 1994, Chapter 3.
(Continued)

*Primary Examiner* — Drew E Becker
*Assistant Examiner* — Bryan Kim
(74) *Attorney, Agent, or Firm* — Mars, Incorporated

(57) ABSTRACT

The present invention provides a longer-lasting edible animal chew (1) having a longitudinal axis comprising: i) an outer wall (2) extending in the direction of said longitudinal axis; and ii) an internal support structure (4) that contacts the inner surface of said outer wall (2) at three or more points.

20 Claims, 4 Drawing Sheets

Figure 3A:
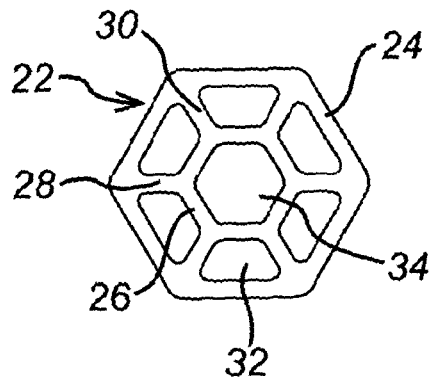

(58) Field of Classification Search
CPC ........ A23K 40/20; A23K 40/25; A23K 50/40; A23K 20/147; A23K 20/158; A23K 40/00; A23K 50/45; A23K 50/42; A23L 1/0073; A23L 1/0076; A23L 1/095; A01K 15/026; A01K 29/00
USPC ......... 118/709, 710, 711; 119/709, 710, 711; 119/707–708; D01/106, 126, 199, 125, D01/127

See application file for complete search history.

(56) References Cited

U.S. PATENT DOCUMENTS

| | | | |
|---|---|---|---|
| 2,285,508 | A | 6/1942 | Goss |
| 2,677,613 | A | 5/1954 | Shiah |
| 2,784,097 | A * | 3/1957 | Heyman ............... A23G 3/566 426/139 |
| 3,032,422 | A | 5/1962 | Alikonis |
| 3,230,582 | A | 1/1966 | Hoffman |
| 3,271,821 | A | 9/1966 | Street |
| 3,348,599 | A | 10/1967 | Lohstoeter |
| 3,462,277 | A | 8/1969 | Reinhart |
| 3,493,996 | A | 2/1970 | Rohn |
| 3,792,950 | A | 2/1974 | Cuff |
| 4,021,927 | A | 5/1977 | Idaszak |
| 4,099,900 | A | 7/1978 | Bradbury et al. |
| 4,145,447 | A | 3/1979 | Fisher |
| 4,151,241 | A | 4/1979 | Bradbury et al. |
| 4,156,707 | A | 5/1979 | Joshi |
| 4,276,319 | A | 6/1981 | Nguyen et al. |
| 4,284,652 | A | 8/1981 | Christensen |
| 4,539,214 | A | 9/1985 | Winter et al. |
| 4,662,836 | A | 5/1987 | Kelchner, Jr. |
| 4,954,061 | A | 9/1990 | Repholz |
| D311,629 | S * | 10/1990 | Ragot ............... D1/126 |
| 5,032,082 | A | 7/1991 | Herrera |
| 5,072,927 | A | 12/1991 | Santos |
| 5,076,570 | A | 12/1991 | Davis |
| 5,153,017 | A | 10/1992 | Schaaf |
| 5,407,661 | A | 4/1995 | Simone et al. |
| 5,431,927 | A | 7/1995 | Hand et al. |
| 5,519,918 | A | 5/1996 | Chang |
| D374,753 | S * | 10/1996 | Tintle ............... D1/106 |
| 5,706,588 | A | 1/1998 | Dausch et al. |
| 5,723,082 | A | 3/1998 | Mizuguchi et al. |
| 5,827,565 | A | 10/1998 | Axelrod |
| 5,830,260 | A | 11/1998 | Yueksel et al. |
| 5,948,336 | A | 9/1999 | Yoshida et al. |
| 6,086,940 | A | 7/2000 | Axelrod |
| 6,148,771 | A * | 11/2000 | Costello ............... A01K 15/026 119/709 |
| 6,200,616 | B1 | 3/2001 | Axelrod |
| 6,220,847 | B1 | 4/2001 | Yoshida et al. |
| 6,268,012 | B1 | 7/2001 | Sikora et al. |
| D448,138 | S * | 9/2001 | Gokturk ............... D1/106 |
| 6,484,913 | B1 | 11/2002 | Hancock et al. |
| 6,495,176 | B1 | 12/2002 | Mcgenity |
| 6,574,504 | B1 | 6/2003 | Mazaury et al. |
| 6,669,975 | B1 | 12/2003 | Abene |
| D485,661 | S | 1/2004 | Harris |
| 6,688,258 | B1 | 2/2004 | Kolesar |
| 6,787,073 | B1 | 9/2004 | Tadler et al. |
| D499,266 | S | 12/2004 | Ricci |
| 6,881,430 | B2 | 4/2005 | Kohler et al. |
| 6,904,870 | B2 | 6/2005 | Russell-Maynard et al. |
| 6,935,855 | B2 | 8/2005 | Flarup-Knudsen |
| 7,024,800 | B2 | 4/2006 | Carin et al. |
| 7,032,541 | B1 * | 4/2006 | Tsengas ............... A01K 15/026 119/709 |
| D526,461 | S * | 8/2006 | Haro ............... D1/106 |
| 7,087,260 | B2 | 8/2006 | Axelrod |
| D529,667 | S | 10/2006 | Axelrod |
| D531,365 | S | 10/2006 | Axelrod |
| 7,128,546 | B2 | 10/2006 | Chszaniecki et al. |
| 7,273,327 | B2 | 9/2007 | Hohlbein et al. |
| 7,279,189 | B2 | 10/2007 | Lauro |
| 7,377,052 | B2 | 5/2008 | Maruca |
| D579,745 | S | 11/2008 | Huang |
| 7,490,579 | B2 | 2/2009 | Axelrod |
| 7,647,894 | B2 | 1/2010 | Axelrod et al. |
| 7,691,315 | B2 | 4/2010 | Axelrod |
| 7,691,426 | B2 | 4/2010 | Axelrod et al. |
| 7,722,911 | B2 | 5/2010 | Liu et al. |
| 7,799,364 | B2 | 9/2010 | Colliver et al. |
| 7,851,001 | B2 | 12/2010 | Axelrod |
| 7,879,377 | B2 | 2/2011 | Dahl |
| 7,910,139 | B2 | 3/2011 | Bombardelli |
| 8,137,731 | B2 | 3/2012 | Pater et al. |
| 8,257,775 | B2 | 9/2012 | Axelrod et al. |
| 8,524,299 | B2 | 9/2013 | Brent, Jr. |
| 8,548,817 | B2 | 10/2013 | Torney et al. |
| 8,746,181 | B2 | 6/2014 | Berger |
| 8,776,728 | B2 | 7/2014 | Xu |
| 8,899,187 | B2 | 12/2014 | Axelrod |
| 9,060,528 | B2 | 6/2015 | Axelrod |
| 9,211,654 | B2 | 12/2015 | Tashiro et al. |
| D778,706 | S | 2/2017 | Atkins |
| D822,337 | S | 7/2018 | Keen |
| D834,782 | S | 12/2018 | Keen |
| 2003/0021872 | A1 * | 1/2003 | Cupp ............... A23K 1/1631 426/573 |
| 2003/0131803 | A1 * | 7/2003 | Willinger ............... A01K 15/025 119/707 |
| 2004/0086616 | A1 * | 5/2004 | Nie ............... A23K 1/003 426/549 |
| 2004/0126462 | A1 | 7/2004 | Tepper et al. |
| 2006/0003060 | A1 | 1/2006 | Lauro |
| 2006/0102099 | A1 | 5/2006 | Edwards |
| 2006/0107905 | A1 | 5/2006 | Axelrod |
| 2006/0141009 | A1 | 6/2006 | Huron et al. |
| 2006/0165854 | A1 * | 7/2006 | Levin ............... A23K 1/001 426/132 |
| 2006/0188611 | A1 | 8/2006 | Unlu et al. |
| 2006/0292288 | A1 | 12/2006 | Russell |
| 2007/0148282 | A1 | 6/2007 | Zubair et al. |
| 2007/0172566 | A1 | 7/2007 | Smith et al. |
| 2007/0224131 | A1 | 9/2007 | McCollum et al. |
| 2007/0284771 | A1 | 12/2007 | Boothe et al. |
| 2008/0003270 | A1 * | 1/2008 | Garcia Martinez .... A23K 40/20 424/442 |
| 2008/0064773 | A1 | 3/2008 | Levin |
| 2008/0124423 | A1 | 5/2008 | Peterson et al. |
| 2009/0120372 | A1 | 5/2009 | Townsend et al. |
| 2009/0148560 | A1 | 6/2009 | Shiba |
| 2009/0202700 | A1 * | 8/2009 | Bunke ............... A21D 10/025 426/549 |
| 2009/0324780 | A1 | 12/2009 | Slusarczyk et al. |
| 2010/0003393 | A1 | 1/2010 | Torney et al. |
| 2010/0055284 | A1 * | 3/2010 | Karwowski et al. ......... 426/560 |
| 2010/0061944 | A1 | 3/2010 | Marshall-Jones et al. |
| 2010/0266743 | A1 * | 10/2010 | Chen et al. ............... 426/549 |
| 2010/0310750 | A1 | 12/2010 | She et al. |
| 2011/0076363 | A1 | 3/2011 | Niehues |
| 2011/0290197 | A1 * | 12/2011 | Koo ............... A01K 15/026 119/710 |
| 2011/0300197 | A1 | 12/2011 | McGenity et al. |
| 2012/0111284 | A1 | 5/2012 | Berger |
| 2012/0234259 | A1 | 9/2012 | Xu |
| 2013/0000565 | A1 | 1/2013 | Koo et al. |
| 2013/0074780 | A1 * | 3/2013 | Wechsler ............... A01K 15/026 119/710 |
| 2014/0220187 | A1 | 8/2014 | Essler |
| 2014/0295052 | A1 | 10/2014 | Elliot et al. |
| 2015/0276310 | A1 | 10/2015 | Schmidt et al. |
| 2016/0029664 | A1 | 2/2016 | Slusarczyk et al. |
| 2016/0198740 | A1 | 7/2016 | Quest et al. |
| 2016/0348967 | A1 | 12/2016 | Schmidt et al. |
| 2016/0355290 | A1 | 12/2016 | Schmidt et al. |
| 2017/0323667 | A1 | 11/2017 | Sun et al. |
| 2017/0332669 | A1 | 11/2017 | Danset et al. |
| 2018/0177156 | A1 | 6/2018 | Heath et al. |

(56) References Cited

U.S. PATENT DOCUMENTS

| | | |
|---|---|---|
| 2018/0325145 A1 | 11/2018 | Torney et al. |
| 2019/0200574 A1 | 7/2019 | Keen et al. |
| 2020/0268021 A1 | 8/2020 | Slusarczyk |

FOREIGN PATENT DOCUMENTS

| | | |
|---|---|---|
| DE | 20311743 | 9/2003 |
| EP | 0094448 A1 | 11/1983 |
| EP | 0697177 | 2/1996 |
| EP | 0710670 A1 | 5/1996 |
| EP | 1374700 | 1/2004 |
| GB | 2041717 A | 9/1980 |
| GB | 1583644 A | 1/1981 |
| JP | 3-164142 | 7/1991 |
| JP | H08109119 A | 4/1996 |
| JP | 10150925 | 9/1998 |
| JP | 2007044004 A5 | 8/2008 |
| JP | 2012034675 | 2/2013 |
| WO | 0150882 | 7/2001 |
| WO | 0240386 A1 | 5/2002 |
| WO | 2005092087 | 10/2005 |
| WO | 2006127744 A1 | 11/2006 |

OTHER PUBLICATIONS

Quigley, et al., "Comparative Cleaning Efficiency of Manual and Power Brushing", J. Am. Dent. Assoc., 1962, 65:26-29.

Turesky, et al., "Reduced Plaque Formation by the Chloromethyl analogue of victaimine", J. Periodontol., 1970, 41:41-43.

Warrick, et al., "A More Sensitive Method of Scoring Calculus", 11th Annual Veterinarian Dental Forum, 1997 Denver, USA.

Lewis, Converting to Natural Colors in Confectionery, 63rd PMCA Production Conference, Jan. 1, 2009, pp. 2-7.

International Preliminary Report on Patentability dated Jun. 3, 2009 during the prosecution of International Applicaiton No. PCT/GB2007/004532 (9 pgs).

International Search Report and Written Opinion dated Feb. 22, 2008 during prosecution of International Application No. PCT/GB2007/004532 (18 pgs).

King, et al., Prognostic Factors in Cats with Chronic Kidney Disease, J Vet Intern Med, May 21, 2007, 906-16.

Alavi, et al., Rheological Characterstics of Intermediate Moisture Blends of Pregelatinized and Raw Wheat Starch, J. Agric. Food Chem., vol. 50, pp. 6740-6745, Oct. 2002.

Leclerc, et al., Higher neonatal growth rate and body condition score at 7 months are predictive factors of obesity in adult femaile Beagle dogs, BMC Veterinary Research, 2017, 13 pages, vol. 13, No. 104.

Romani, et al., Identification and quantitation of polyphenols in leaves of *Myrtus communis* L, Chromatographia, Wiesbaden DE, Jan. 1999, pp. 17-20, vol. 49, No. 1-2.

Sugar Pressure, http://www.sugarpressure.com/licorice/; accessed on Apr. 9, 2018; published on Mar. 8, 2011,14 pages.

VetX—The Vet Only Resource, Nov. 16, 2017, from https://www.vetx.com/index.php?threads/meet-the-chewing-robot-dog-from-mars.5159/, 5 pgs.

\* cited by examiner

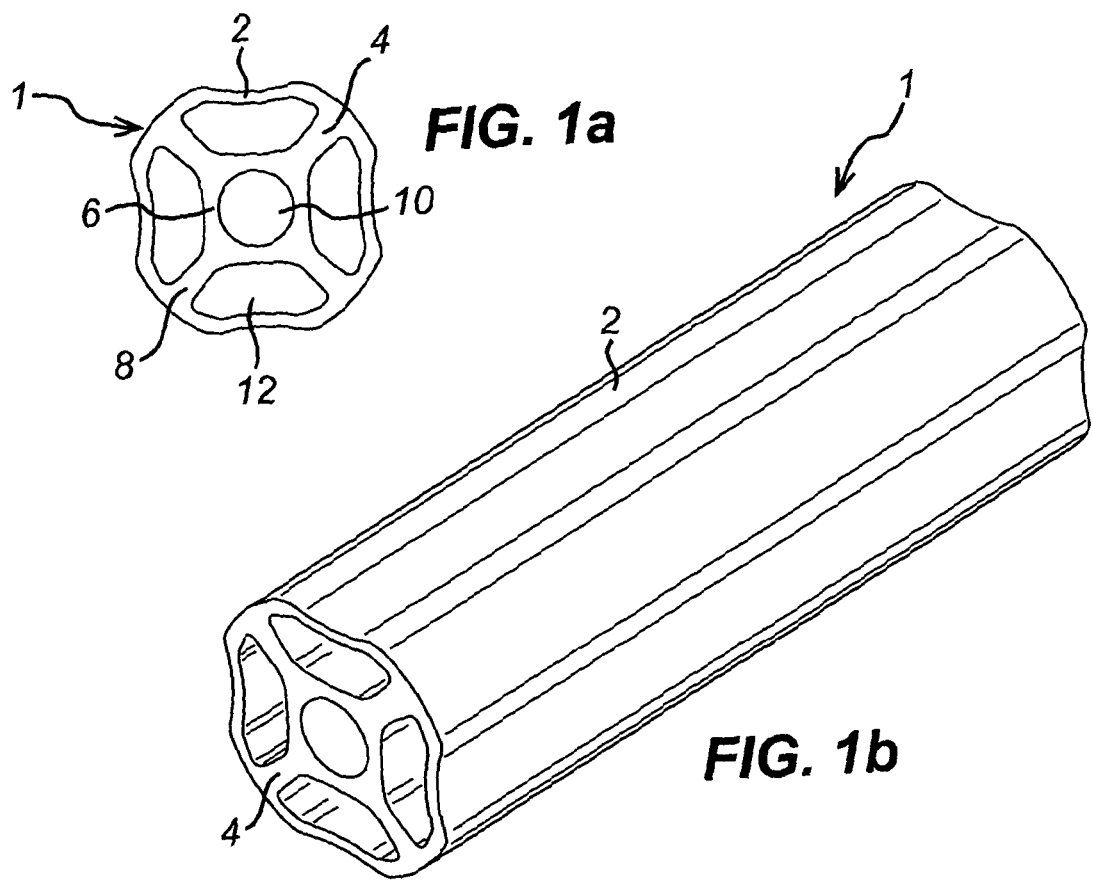
FIG. 1a
FIG. 1b
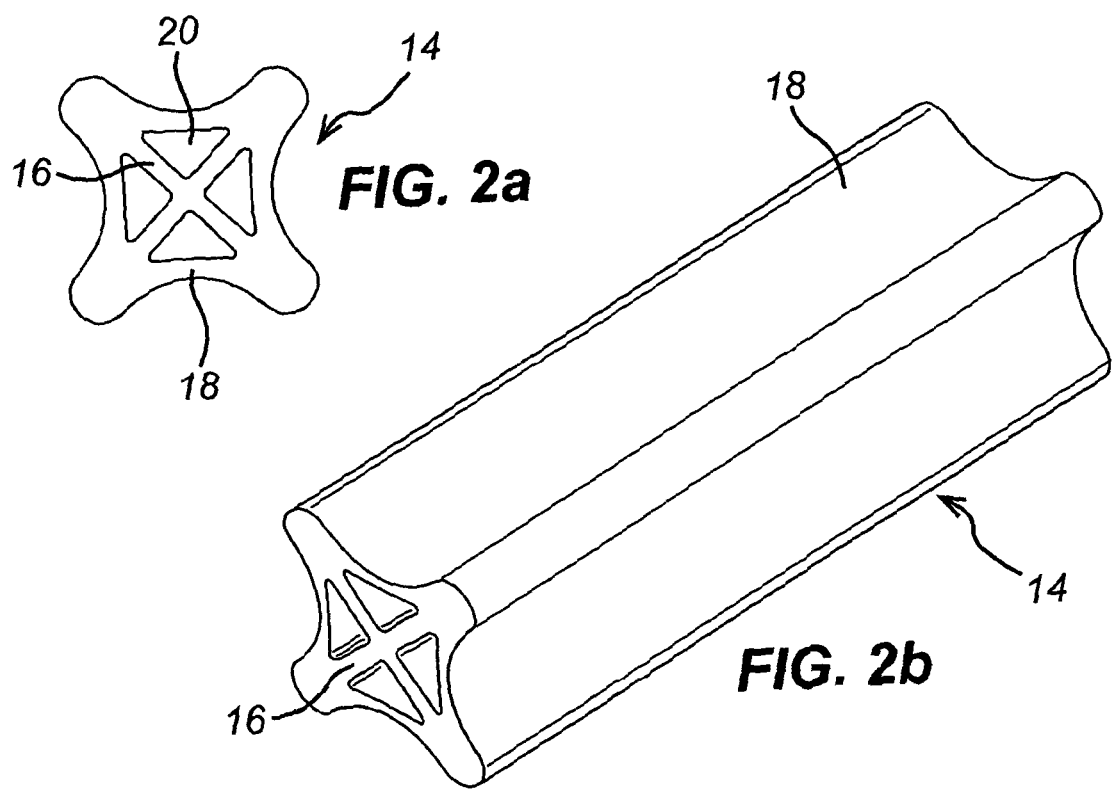
FIG. 2a
FIG. 2b

EDIBLE ANIMAL CHEWS

The present invention relates to animal chews and, in particular, to dog chews, which have a long lasting time.

Most dogs enjoy chewing, and owners are therefore often keen to provide suitable chewing products for their animals. Some chewing products are made from materials such as plastics, which are essentially inedible (although dogs may sometimes swallow them) and are indigestible. Such chewing products lack nutritional value and are tasteless and unpalatable to many dogs. Rawhide chews are also commonly available. However, such chews are similarly indigestible and of low palatability. This can lead to the additional negative consequence that a soggy, partially chewed product is left behind by the dog. This can be unhygienic and unpleasant for the owner.

In addition, indigestible chews can have adverse effects on the dog's digestion once swallowed: such chews can become impacted in the dog's intestinal tract with life-threatening consequences.

There is therefore a desire amongst dog owners for products that are fully edible. There exist several products which, to this end, are made predominantly from food ingredients. U.S. Pat. Nos. 5,827,565 and 6,086,940 relate to dog chews which are made predominantly of starch.

Previously, the lasting time of chews has been adjusted by altering the hardness of the chew material. Such adjustments can lead to the disadvantage that the resulting chew is either too hard or too soft. In the case of hard chews, young dogs with insufficiently developed teeth or old dogs with decayed or missing teeth might be unable to chew on the product at all. In some cases hard chews can pose a risk to the dog's health, for example through slab fractures of the teeth. Soft chews are a problem because they are generally eaten very quickly by the dog and are not chewed for a sufficient amount of time. Owners are often left dissatisfied if their dog rapidly chews the product they have purchased, often at a significant cost, rather than enjoying the chew for a longer time.

It should be noted that an animal 'chew' is quite distinct from an animal or pet 'food', and the two differ in terms of the size of the pieces, in terms of the time taken to consume the product, and in terms of their nutritional content.

With regard to the size of the pieces, the largest pieces in a 'food' are smaller than those in a 'chew'. For instance, WO-01/50882 discloses a food product which is reported as having a large size compared to other dried pet food, and discloses several examples. The largest of these examples is a triangular kibble having the following dimensions: thickness 16 mm, base 28 mm and sides 32 mm. An animal chew has a largest dimension which is significantly larger. As used herein, a 'chew' is an individual piece having a largest dimension of at least about 50 mm, preferably at least about 60 mm, and preferably at least about 70 mm.

With regard to the time taken to consume the product, the animal will normally take much longer to consume a piece of 'chew' than a piece of 'food'. A piece of 'food' may generally be consumed in less than 30 seconds by an average size dog, whereas a 'chew' would take at least 90 seconds to consume.

Various shapes of edible animal chews have been suggested. For example, US 2007/0212456 describes animal chews in the shapes of a fish, spare ribs and a t-bone steak. This reference also describes the use of a first material covered by a second material. U.S. D485661 and DE 20311743 describe the use of cylindrical animal chews.

It is an object of this invention to provide an edible animal or pet chew which exhibits increased lasting time.

It has been found that an internal support structure within the edible chew provides longer lasting time per gram of product. This has the additional benefits of reducing the animal's calorie intake rate and increasing the amount of cleaning of the oral cavity (teeth and gums) compared to existing chews of the same material content. It also means that it is possible to use less material when producing a chew for a given lasting time.

According to the present invention, there is provided an edible animal chew having a longitudinal axis comprising:
  (i) an outer wall extending in the direction of said longitudinal axis; and
  (ii) an internal support structure that contacts the inner surface of said outer wall at three or more points.

The internal support structure preferably defines a plurality of channels that extend in the direction of said longitudinal axis.

Animal chews of the present invention are preferably pet chews, more preferably dog chews.

The animal chew is generally elongate in shape, and the longitudinal axis of the animal chew is the axis that runs in the direction of the length of the animal chew. The longitudinal axis extends down the centre of the chew, perpendicular to the transverse cross-section. For example, if the animal chew is cylindrical in shape, then the longitudinal axis is the axis that runs perpendicular to the circular cross-section, and parallel to the walls, through the centre of the chew.

The outer wall of the animal chew defines the external shape of the animal chew. The outer wall has an inner surface that faces inwards towards the longitudinal axis of the animal chew. So, for the example of a chew that has the external appearance of a cylinder, the outer wall is the cylinder that forms the shell of the animal chew and the inner wall corresponds to the inner circumference of the circular outer wall cross-sectional shape.

The outer wall preferably has a cross-sectional shape that is substantially constant as it extends in the direction of the longitudinal axis, which increases the ease of manufacture of the chew. In an alternative embodiment, however, the cross-sectional shape may vary. Suitable cross-sectional shapes for the outer wall include shapes substantially described by polygons (including regular polygons), circles or ellipses. For instance, the outer wall cross-sectional shape may be a triangle, a square, a rectangle, a hexagon, or an octagon. Alternatively, the outer wall cross-sectional shape may be an irregular shape or contain curved sections.

The outer wall typically has a substantially constant wall thickness at each point around the circumference of the chew. The outer wall typically has a wall thickness that is substantially constant as the outer wall extends in the direction of the longitudinal axis of the chew. In one embodiment, however, the outer wall thickness may vary. The term "circumference" as used herein is not intended to refer only to an outer wall which is circular or elliptical, but refers also to the outer wall of chews of all other shapes possible for the present invention.

The internal support structure is contained within the outer wall of the animal chew. The internal support structure provides support to the outer wall. It contacts the inner surface of the outer wall at 3 or more points, preferably at 4 or more points, and in alternative embodiments at 5 or more points, at 6 or more points, at 7 or more points, or at 8 or more points. The internal support structure spans all of the points it contacts on the inner surface of the outer wall.

The internal support structure preferably defines a plurality of channels that extend in the longitudinal direction. The channels extend the length of the outer wall of the chew, i.e. they are coextensive with the outer wall in the direction of the longitudinal axis. Thus, the internal support structure also extends the length of the outer wall of the chew. The internal support structure is substantially parallel to the outer wall as it extends in the direction of the longitudinal axis, and it is preferably also of a substantially constant transverse cross-sectional shape as it extends in the direction of the longitudinal axis in order to increase ease of manufacture. In an alternative embodiment, however, the internal support structure may have a cross-sectional shape that varies as it extends in the direction of the longitudinal axis.

The plurality of channels may have cross-sectional shapes when viewed in the longitudinal direction (i.e. transverse cross-sectional shapes) that are polygons, circles or ellipses. Thus, the plurality of channels may have transverse cross-sectional shapes that are circular, triangular, square, rectangular or hexagonal. The plurality of channels may have the same transverse cross-sectional shape or they may have different transverse cross-sectional shapes. The plurality of channels may have a mixture of transverse cross-sectional shapes. The channels may be arranged so that their transverse cross-sectional shapes tessellate, being separated by the presence of one or more structural elements of the internal support structure. The internal support structure is preferably of a substantially constant thickness in the transverse direction between the channels. Alternatively, the internal support structure has a thickness in the transverse direction that varies around the edges of the channels.

The internal support structure increases the time required by an animal to break up and consume the chew. It is believed that the presence of an internal support structure increases the chewing time required to break up the animal chew in several ways. The presence of the internal support structure supports the outer wall when it is being chewed by an animal. Also, after the animal has broken through the outer wall, the presence of the internal support structure means additional chewing is required in order to completely consume the product.

By contacting the outer wall at three or more points, the internal support structure ensures the outer wall is not just supported in one linear direction, but is supported in at least a 2-dimensional plane.

The presence of channels within the internal support structure allows the structure to improve the lasting time of the animal chew, while reducing the internal support structure's contribution to the calorie content of the animal chew.

As used herein, the 'lasting time' of a chew refers to the time taken for the animal to completely consume the product, i.e. the time from when the animal first begins to chew the product to the time when the animal swallows the last pieces of the product. The lasting time excludes any time that that the animal may be playing with the product but not actually chewing it.

The increased lasting time associated with animal chews of the present invention has numerous advantages. Animals' teeth and gums are cleaned by the chewing action, so the increased lasting time potentially results in a greater amount of teeth and gum cleaning. The increased lasting time also reduces the rate of calorie intake as the animal consumes the chew. The animal chews of the present invention result in greater design flexibility when manufacturing animal chews, as chews of the present invention can last longer for a given calorie content compared to prior art animal chews, or have a lower calorie content for a given lasting time compared to prior art animal chews, or have an increased lasting time coupled with a decreased calorie content compared to prior art animal chews. The increased lasting time associated with the animal chews of the present invention also facilitates the use of softer chew materials, that otherwise wouldn't result in chews with an acceptable lasting time.

The channels defined by the internal support structure will be surrounded by the structural elements of the internal support structure optionally in combination with the outer wall when viewed in cross-section in the direction of the longitudinal axis (i.e. the transverse cross-section). Some channels may be completely surrounded only by the internal support structure when viewed in transverse cross-section. The feature of the internal support structure that is completely and solely surrounding a channel is termed herein as an inner wall. For channels completely surrounded by an inner wall, the outer wall does not form a part of its perimeter. The edible animal chew may contain one or more channels completely surrounded by an inner wall. Expressed in another way, the internal support structure may comprise at least one inner wall that defines one of the channels. The term 'surrounded' is used herein to refer to the enclosing of the channel in a 2-dimensional sense, and does not indicate that the channel is surrounded in all 3-dimensions to form an enclosed space; as noted hereinabove the channels extend the length of the outer wall of the chew.

The transverse cross-sectional shape of the channel surrounded by the inner wall may directly result from the cross-sectional shape of the inner wall, or the transverse cross-sectional shape of the channel may be different from the transverse cross-sectional shape of the inner wall which surrounds it. The possible channel shapes described herein will also apply as possible inner wall transverse cross-sectional shapes.

The inner wall is connected to the outer wall by structural elements referred to herein as struts, the struts forming part of the internal support structure. Thus, in a preferred embodiment the internal support structure comprises struts and at least one inner wall.

Where the inner wall is a polygon, it may be contacted by a strut at one or more of its vertices or it may be contacted by struts at all of its vertices. These struts may then also contact the outer wall or another inner wall, and where these other walls are polygons the struts may contact these walls at their vertices.

It is preferred that the internal support structure comprises at least one inner wall that defines one of said channels, said inner wall extending in the direction of said longitudinal axis.

The presence of an inner wall within the internal support structure further contributes to the increased lasting time exhibited by the animal chews of the present invention. Once the animal has broken through the outer wall of animal chew, they will still have to break through the struts that connected the outer wall to the inner wall, and then break through the inner wall itself. All of this contributes to increasing the work required of the animal to consume the animal chew, and therefore increases the animal chew's lasting time.

In one embodiment, the transverse cross-sectional shapes of the outer wall and/or the inner wall comprise at least one symmetry element. Typically, the transverse shape of the outer wall and the internal support structure combined will result in the transverse cross-section of the animal chew comprising at least one symmetry element. At least one symmetry element includes, for instance, an axis of rotational symmetry or one or more lines of reflectional symmetry, or a combination thereof. Typically, the transverse cross-sectional shapes comprise an axis of rotational symmetry and one or more lines of reflectional symmetry. The rotational symmetry is preferably at least 3-fold symmetry, for instance 4-fold, 5-fold or 6-fold rotational symmetry. The transverse cross-sectional shape preferably exhibits at least 3 lines of reflectional symmetry, for instance, 4, 5, 6, 8, 12 or more lines of symmetry. It will be appreciated that, in practice, minor irregularities in the extruded transverse cross-sectional shapes of the chew mean that the symmetry elements described herein do not require precise identity or indistinguishabiity after a symmetrical transformation, only that the cross-sectional shape is theoretically or substantially the same after such a symmetrical transformation.

The transverse cross-sectional shapes possessing at least one symmetry element will ensure a consistency in the mechanical properties of the animal chew around its transverse circumference.

In a preferred embodiment, the plurality of channels may be hollow. This keeps the calorie content of the animal chew low. Alternatively, the channels may be filled with a material different to that used for the outer wall and/or the internal support structure.

The outer wall and the internal support structure are suitably integrally formed, to allow maximum structural rigidity and ease of manufacture. The outer wall and the internal support structure are suitably made from the same material.

FIGS. 1-7 show various configurations of animal chews of the present invention that incorporate internal support structures to improve the lasting time of the animal chew. The 'a' part of the figures depicts the animal chew in transverse cross-section, while the 'b' part of the figures depicts the animal chew in a perspective view.

FIGS. 1a and 1b depict an animal chew 1 where the outer wall 2 has an octagonal transverse cross-sectional shape that is made up of curved sections between eight vertices. The internal support structure 4 of this edible animal chew 1 has an inner wall 6 and struts 8 joining the vertices of the inner wall 6 to the outer wall 2, herein midway between the vertices of the outer wall 2. The inner wall 6 has the transverse cross-sectional shape of a square. The internal support structure 4 results in five channels where one channel 10 is surrounded (when viewed in the direction of the longitudinal axis) by an inner wall 6 composed entirely of the internal support structure 4 and the four other channels 12 are surrounded (when viewed in the direction of the longitudinal axis) by a combination of the internal support structure 4 and the outer wall 2. The channel 10 surrounded by the inner wall 6 has a circular transverse cross-sectional shape. The internal support structure 4 contacts the outer wall 2 at four points.

FIGS. 2a and 2b depict an animal chew 14 with an internal support structure 16 that does not comprise an inner wall. The outer wall 18 is a transverse cross-sectional shape containing curved sections. The outer wall 18 thickness varies around the outer wall 18 and is thickest where the internal support structure 16 contacts the outer wall 18. The internal support structure 16 is of a constant thickness and separates the edible animal chew 14 into four channels 20 with the same triangular transverse cross-sectional shapes, which tessellate. The internal support structure 16 contacts the outer wall 2 at four points.

Figure 3B:
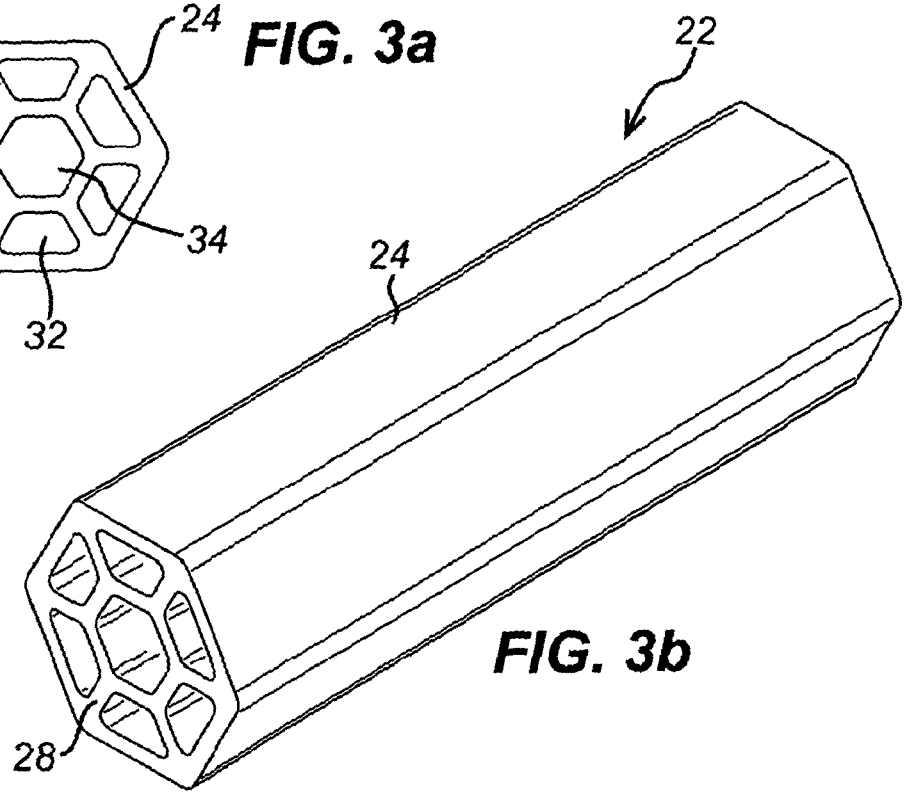

FIGS. 3a and 3b depict an animal chew 22 where the outer wall 24 and the internal support structure's inner wall 26 have the transverse cross-sectional shape of a hexagon and the internal support structure 28 further comprises struts 30 connecting the vertices of the inner wall 26 to the vertices of the outer wall 24. There are seven channels in total. The six channels 32 that are surrounded by a combination of the internal support structure 28 and the outer wall 24 have the shape of half hexagons and tessellate with the central hexagonal channel 34 defined by the inner wall 26 of the internal support structure 28. The internal support structure 28 contacts the outer wall 24 at six points.

Figure 4A:
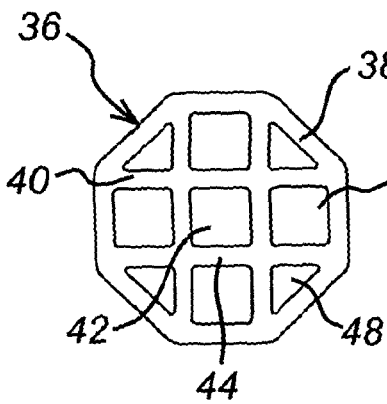
Figure 4B:
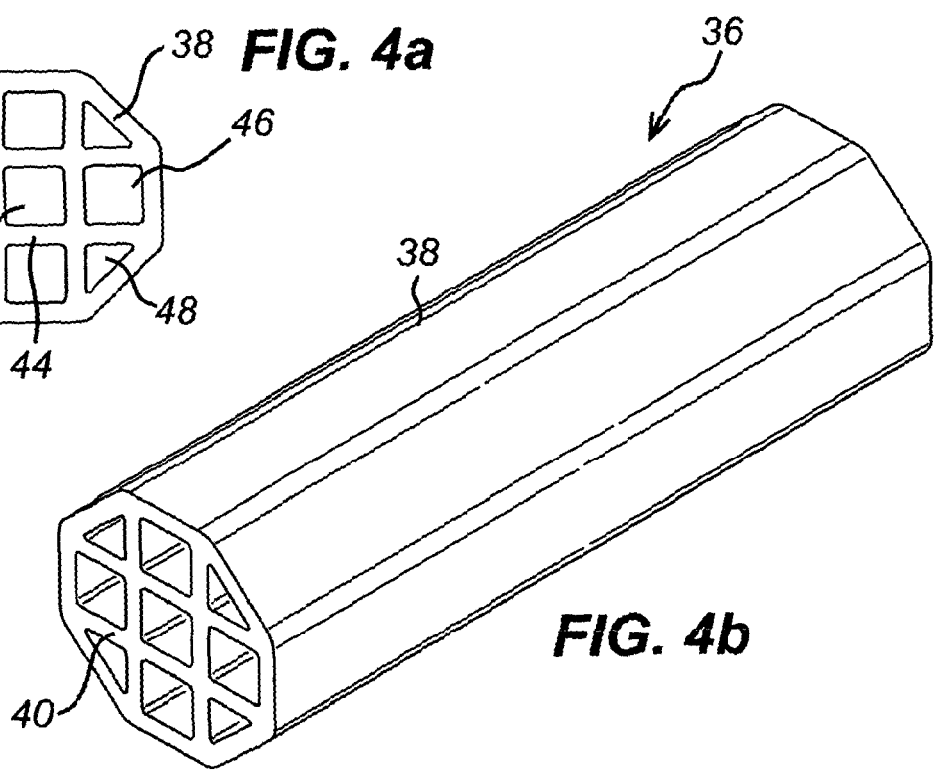

FIGS. 4a and 4b depict an animal chew 36 where the outer wall 38 is an octagon and the internal support structure 40 defines nine channels, one 42 of which is surrounded solely by an inner wall 44 of the internal support structure 40. Five of the channels 42, 46 have a square transverse cross-sectional shape and four of the channels 48 have a triangular transverse cross-sectional shape. The channels tessellate. The internal support structure 40 contacts the outer wall 38 at eight points.

Figure 5A:
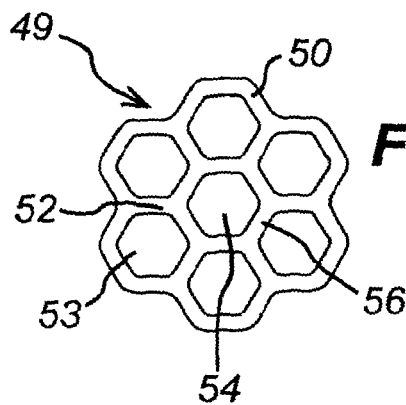
Figure 5B:
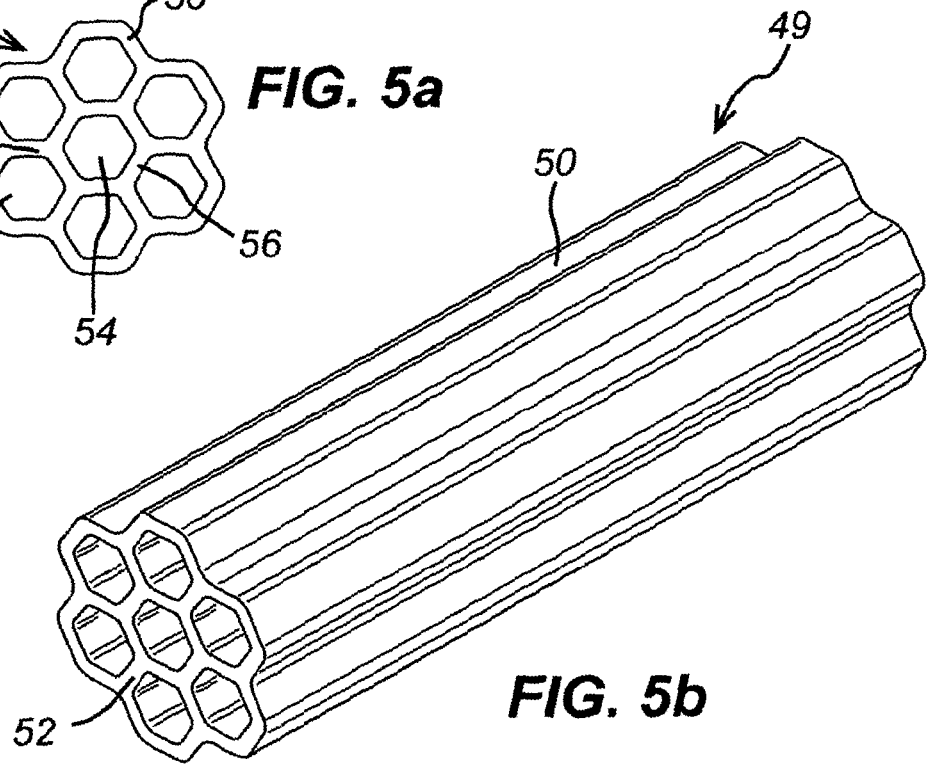

FIGS. 5a and 5b depict an animal chew 49 with an 18-sided outer wall 50 and an internal support structure 52 that defines seven tessellating hexagonal channels 53, 54, where one channel 54 is defined by an inner wall 56 of the internal support structure 52. The internal support structure 52 contacts the outer wall 50 at six points.

Figure 6A:
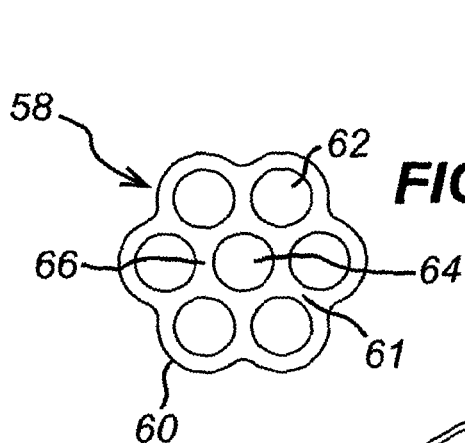
Figure 6B:
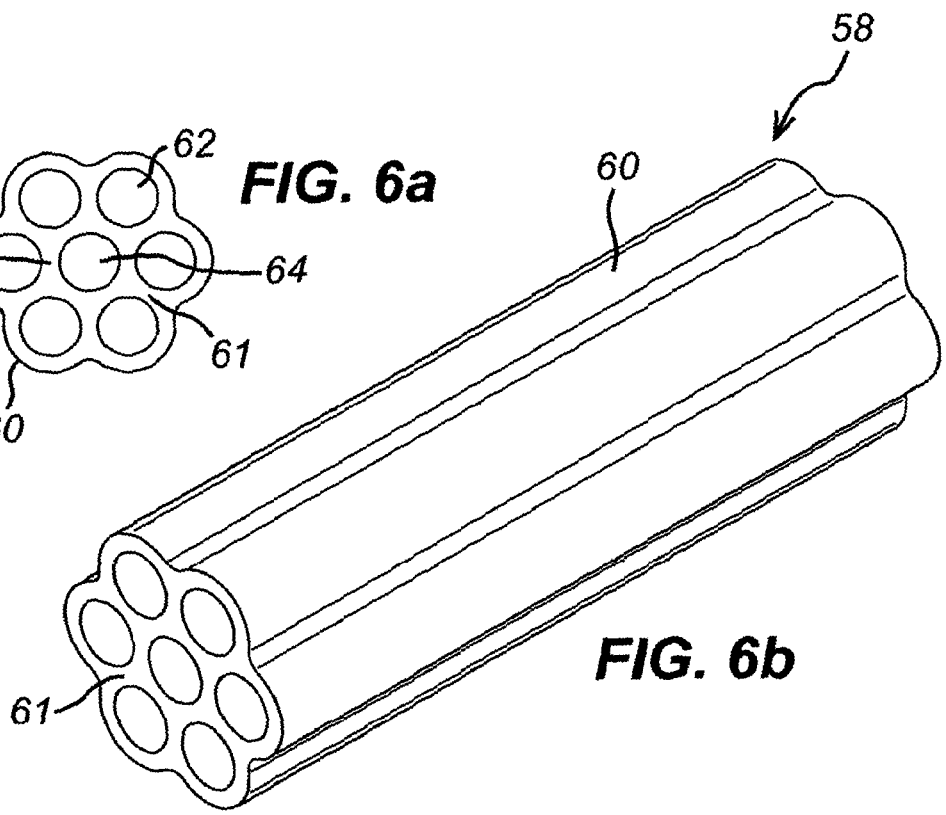

FIGS. 6a and 6b depict an animal chew 58 with an outer wall 60 that has a transverse cross-sectional shape that consists of curved sections. The internal support structure 61 defines seven circular channels 62, 64. One 64 of the channels is surrounded by an inner wall 66 of the internal support structure 61. The internal support structure 61 consists of walls of varying thicknesses in the transverse direction. The internal support structure contacts the outer wall 60 at six points.

Figure 7A:
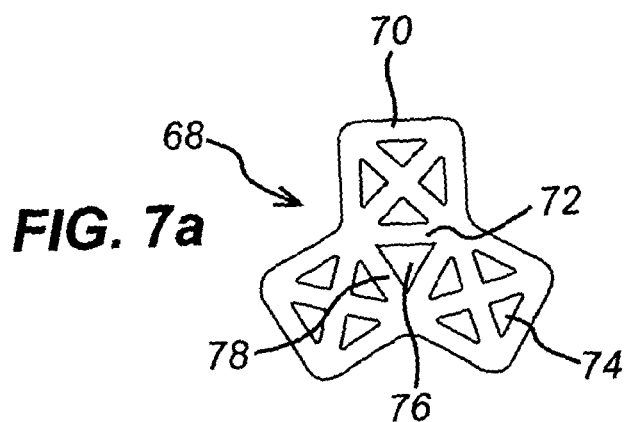
Figure 7B:
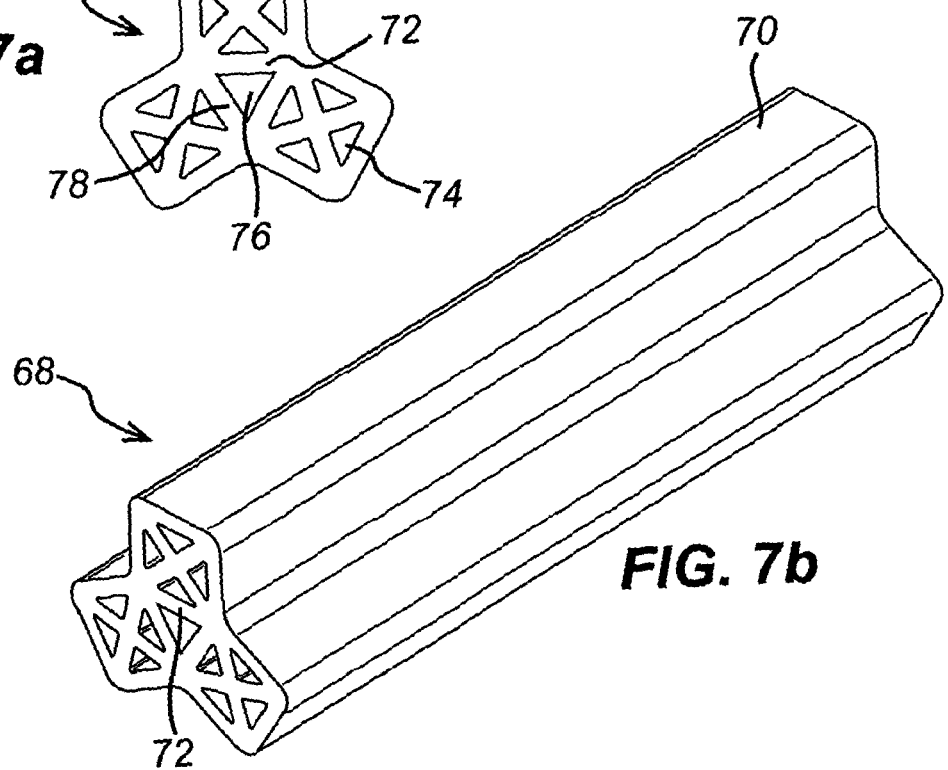

FIGS. 7a and 7b depict an animal chew 68 with an outer wall 70 that has a transverse cross-sectional shape that consists of nine sides and an internal support structure 72 that defines 13 channels 74, 76 with triangular transverse cross-sectional shapes. Four 76 of the channels are surrounded by inner walls 78 of the internal support structure 72. The internal support structure 72 contacts the outer wall 70 at nine points.

Figure 8A:
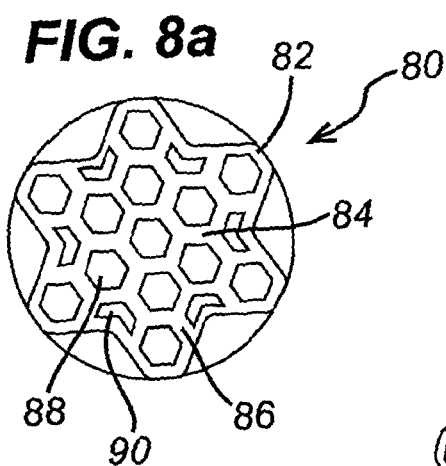
Figure 8B:
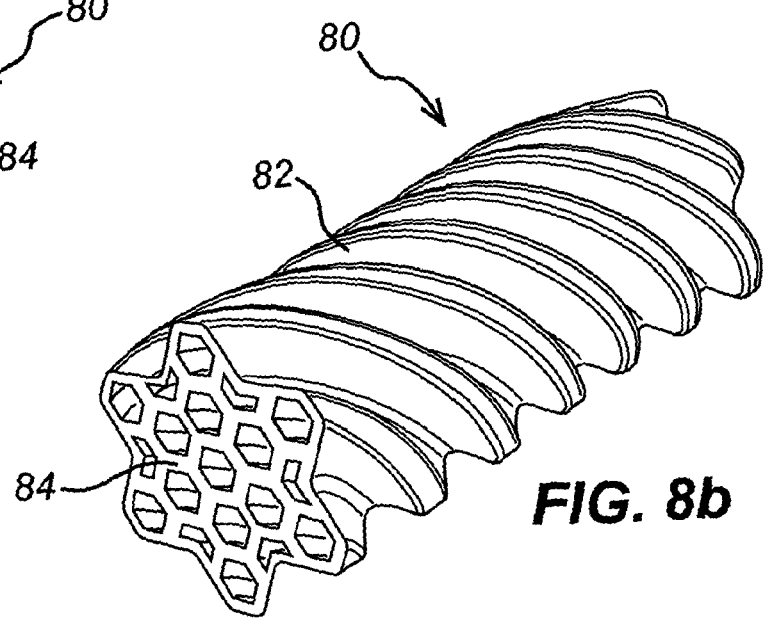

FIGS. 8a and 8b depict an animal chew 80 with an outer wall 82 that has a transverse cross-sectional shape that consists of eighteen sides. The outer wall 82 transverse cross-sectional shape varies along the longitudinal axis of the animal chew 80. Specifically, the orientation of the outer wall 82 transverse cross-sectional shape varies consistently along the longitudinal axis, so that as the outer wall 82 extends in the direction of the longitudinal axis, the outer wall 82 transverse cross-sectional shape rotates about its centre. This results in the outer wall 82 exhibiting a twisting effect. The internal support structure 84 contacts the outer wall 82 at twelve points via struts 86 and results in nineteen channels 88, 90. Seven of the channels are completely surrounded only by the internal support structure when viewed in the transverse cross-section, i.e. these channels are surrounded by inner walls. The majority of channels 88 have the transverse cross-sectional shape of hexagons, although six channels 90 have the transverse cross-sectional shape of a segmented hexagon formed by the combination of the outer wall 82 and the internal support structure 84.

The animal chew may be formed by extrusion of a suitable composition using conventional techniques through an appropriate extrusion die. Any suitable extrusion apparatus may be used, including conventional cooker-extruders, and either single-screw or twin-screw, preferably twin-screw, extruders may be used.

The extrusion die must be sufficiently strong to withstand the extrusion pressures and long enough and intricate enough to enable production of an extruded chew of the appropriate size. Manufacturing such a die nozzle by the standard method of machining a solid metal block would be very costly and may require separate blocks to be machined and then interlocked in order to produce an extrusion die with sufficient length. The preferred method of producing such intricate dies is laser sintering, as described in WO 2008/066797, the disclosure of which is incorporated herein by reference. This method works by building up the extrusion die layer by layer. Initially, a layer of sinterable material is deposited and then irradiated in order to sinter that layer, then the process is repeated by depositing another layer of sinterable material on top of the previously sintered layer and irradiating again. The process is continued until the extrusion die is completed.

The animal chew comprises ingredients which are conventional in the art of making edible animal chews. For instance, the chew may be a primarily carbohydrate-based (typically starch-based) composition, or may be a primarily protein-based composition, or may contain a significant proportion of both carbohydrate (typically starch) and protein. The composition preferably also comprises fibre. The composition optionally also comprises humectants, salt, spices, seasonings, vitamins, minerals, antioxidants, preservatives, flavouring agents, oils, fat, emulsifiers, lipids and the like, as desired.

The starch(es) may be derived from corn, wheat, modified wheat, tapioca, sorghum, potato, sweet potato, rice, oat, beets, barley, soy, other cereals or grains, and mixtures thereof. Tapioca starch, pea starch, mixtures thereof or mixtures of tapioca starch and/or pea starch and any of the aforementioned types may also be used. The starch used may be one type of starch or may alternatively consist of a mixture of types of starches. Pure or substantially pure starches may be used if desired. The type(s) of starch(es) used may be characterised by starch profiles having all possible proportions of amylopectin, intermediates and amylose. The exact source(s) of starch used is not critical. In general the starch source(s) is(are) selected on the basis of cost and palatability considerations.

At least a portion of the starch may be gelatinized starch. Particularly improved lasting time is achieved when the gelatinized starch is in combination with fibre (preferably insoluble fibre), preferably wherein the fibre is dispersed in the gelatinized starch. The term "gelatinized starch" as used herein means starch that has been processed in the presence of water such that its native granular structure has been destroyed and that the crystalline regions of the starch have been melted. Importantly, the effect of such processing is to convert the native starch, which is essentially indigestible, into a form which is digestible.

Protein component(s) may be derived from plants, animals or fungi or combination thereof. Exemplary proteins include wheat gluten, corn zein, corn gluten, sunflower protein, legume protein, soy protein, pea protein, peanut protein, rapeseed, protein, nut protein (e.g., hazelnut, almond, pistachio protein), milk protein (e.g. casein (for instance sodium caseinate, calcium caseinate and potassium caseinate) and whey protein), collagen gelatin, keratin, egg albumin, or mycoprotein. Protein is typically present in amounts no more than about 50%, for instance from about 5% to about 45%, or from about 10% to about 35% by weight.

Highly soluble proteins may be used to alter the texture of the animal chew. Examples of such proteins include milk proteins and, where used, such proteins may be included in amounts up to about 30%, typically from about 3% to about 25%, more typically from about 5% to about 20% by weight. The proteins may be selected to create hydrophobic bonding and disulfide cross-linking, which can promote elasticity. Such proteins are typically rich in prolamines, and examples include wheat gluten, corn zein and soy protein. Proteins rich in prolamines are practically insoluble in water and absolute ethanol but can be dissolved in water-ethanol mixtures. Thus, where used, such proteins may be included in amounts up to about 30%, typically from about 3% to about 25%, more typically from about 8% to about 20% by weight. The protein component may comprise a casein or whey protein in combination with a protein that is rich in prolamines.

Fibre may be soluble or insoluble fibre, and preferably insoluble fibre. The fibre may be any suitable fibre. Examples of suitable fibres include soy fibre, rice hull fibre, pea hull fibre, oat hull fibre, barley hull fibre, sugar beet fibre, wheat bran fibre, fibres derived from animal tissue (for example from the skin, muscles, intestines, tendons, hides of animals), collagen and pure cellulose. Dietary fibre sources include cell wall polysaccharides (cellulose, hemicelluloses, pectins) and non-cell wall polysaccharides (guar, locust bean gums, gum arabic, gum karaya, tragacanth gums, agar, alginates and carrageenan). A suitable cellulose fibre is Solka-Floc™. The fibre is generally selected on the basis of cost and palatability considerations. However, a fibre which results in a lower density product is preferred; for example a cellulose fibre. Mixtures of fibres may be used. In one embodiment, the fibre contains lignin. Fibre typically forms 30% or less by weight, preferably 25% or less by weight, preferably 20% or less by weight.

Exemplary humectants include sucrose, sodium chloride, sorbitol, glycerine, starch hydrolysate, glucose, maltose, lactose, gums, galactose, citric acid, alanine, glycine, high frutose corn syrup, tartaric acid, malic acid, xylose, PEG 400, PEG 600, propylene glycol, aminobutyric acid, mannitol, mannose, or lactulose. More particularly, the humectant is selected from propylene glycol, glycerin and starch hydrolysate, and particularly from combination of all three, for instance wherein the amount of propylene glycol is less than about 10%, more preferably is less than about 4%, and even more preferably is less than about 3% by weight. A humectant may be present in amounts up to about 50%, more typically up to about 35% by weight.

If added, lipids may be any suitable animal fats, for example tallow, or may be vegetable fats, or combinations thereof. Suitable fat sources include corn, soybean, cottonseed, peanut, grapeseed, sunflower, olive oils, tallow, lard, shortening and butter and combinations thereof. Fat may be present in amounts up to about 20%, typically from about 3% to about 15%, and in one embodiment from about 4% to about 9% by weight.

Suitable emulsifiers include lecithin and monoglycerides, and preferably the emulsifier is lecithin. Preferably, an emulsifier will be present in an amount of from 0% to 10% by weight of the chew and more preferably 0% to 6% by weight.

A plasticizer may or may not be present in the animal chew. A plasticizer other than water may or may not be present in the animal chew. If a plasticizer is present, preferably it is mixed with the starch. Although water has suitable plasticizing qualities, as mentioned above, an additional plasticizer may be used. A preferred class of plasticizer is the class of polyols. This class comprises, amongst others, glycol, diethylene glycol, alkylene glycols, polyalkylene glycol, sorbitol, glycerol, glycerol mono-esters and the like. Other suitable classes of plasticizers include esters of citric acid and urea. If a plasticizer other than water is used, glycerol, glycol or a combination thereof is preferred. The glycerol and/or glycol can function both as a plasticizer and a humectant. Preferably, the plasticizer other than water forms less than 35% by weight, more preferably less than 25% by weight, and more preferably less than 15% by weight.

Additional ingredients may include natural and artificial antioxidants, e.g. butylated hydroxyanisole (BHA) and butylated hydroxytoluene (BHT), to retard the oxidation process that can result in rancid product. Mold inhibitors (such as potassium sorbate) can be added to prevent and/or retard the growth of yeasts and molds that result in product spoilage. Ingredients that control water activity can also be included, for example, glycerine and propylene glycol, which also help reduce the risk of microbiological spoilage Texture modifiers, such as cellulose, can also be added. Vitamin and mineral preblends provide appropriate levels of vitamins and minerals required for a balanced daily diet.

The moisture content of the chews is typically no more than about 35% by weight of the chew. Preferably, water forms 25% or less by weight of the chew, more preferably 15% or less by weight, and preferably at least about 5% by weight, more preferably at least 9% by weight. Further, the amount of water in the pet chew may comprise preferably about 5% to about 30%, more preferably about 10% to about 25%, and even more preferably about 10% to about 20% by weight.

As used herein, the term "water activity" is a measurement of the energy status of the water in a system; represented by a quotient between water's partial pressure in the food and pure water's partial pressure. It indicates how tightly water is bound, structurally or chemically, within a substance. This is measured by equilibrating the liquid phase (in the sample) with the vapor phase (in the headspace) and measuring the relative humidity of that space. The water activity (Aw) is typically from about 0.50 to about 0.85, more preferably from about 0.60 to about 0.80, and more preferably from about 0.60 to about 0.75.

In a first embodiment, referred to herein as a starch-based composition, the composition utilises the various ingredients and their respective amounts described hereinabove, in which the total proportion of starch in the chew is greater than or equal to 35% by weight, preferably greater than or equal to 50%, and in a further embodiment at least about 70%, preferably at least about 90%. Fibre is present in the amounts generally as described above, and preferably in an amount of 2 to 20% by weight, typically 5 to 15%, and in one embodiment 5% to 10% by weight of the chew. In an alternative embodiment, the chew contains no fibre.

In a second embodiment, referred to herein as a protein-based composition, the edible animal chew utilises the various ingredients and their respective amounts described hereinabove. Protein is typically present in amounts from about 5% to about 50% by weight of the chew, and otherwise as generically described above. Carbohydrate (typically starch) may be present in an amount of from about 20% to about 80%, more typically from about 25% to about 70%, and preferably from about 30% to about 65% by weight of the chew. Humectant may be present in amounts of from about 5 to about 50% of the chew, and otherwise as generically described above. Fibre may be present in amounts of from about 0.5% to about 15%. Water may be present in amounts of from about 5 to about 30%. Such a composition is disclosed in EP-1692946-A, the disclosure of which compositions is incorporated herein by reference.

In a third embodiment, the animal chew comprises a composition such as that disclosed in WO-2007/149962-A, the disclosure of which compositions is incorporated herein by reference. Thus, the animal chew may comprise:
(a) fibrous protein in an amount of from about 15 to about 90% by weight of the chew;
(b) water-absorbing polymer in an amount of from about 5 to about 35% by weight of the chew, particularly wherein the water-absorbing polymer is selected from the group consisting of gelling proteins, hydrocolloids, edible hydrogels and mixtures thereof;
(c) plasticizer in an amount of from about 5 to about 40% by weight of the chew; and
(d) water in an amount of from about 1 to about 20% by weight of the chew.

The component percentage values "by weight" or "by weight of the chew" recited herein are references to the weight of the component as a percentage of the weight of the final chew, i.e. its dry weight after manufacture. The chews of the present invention are typically made via an extrusion process, in which solid and liquid components are mixed, and these components typically contain water. The manufacturing process typically drives off a proportion of any water present in this mixture within the extruder. Typically, the amount of water driven off as steam is small and is typically less than 5% by weight of the total solid and liquid components added to the extruder. As such, the weight percentage of a given component (other than water or starch) in the chew typically differs by about 2% or less from the weight percentage of that component in the mixture. The weight percentage of starch in the chew typically differs by about 4% or less from the weight percentage of starch in the mixture.

A specific example of a manufacturing process, in this case a conventional extrusion gelatinization process for making a chew comprising gelatinized starch, is as follows. Thus, in an extrusion gelatinization process, a dry feed mixture is prepared from the starch source in the form of a flour or meal, and optionally a fibre source. The dry feed mixture may then be fed into a preconditioner or straight into the extruder. In the preconditioner, water or steam, or both, is mixed into the dry feed mixture. Further, liquid flavour components, such as flavour digests or tallow, may be mixed into the dry feed mix in the preconditioner. Sufficient water and/or steam, and optionally liquid flavour components, is/are mixed into the feed mixture to raise the moisture content of the dry feed mixture. The moistened feed leaving the preconditioner is then fed into an extruder. The extruder may be any suitable single or twin screw cooking-extruder. Suitable extruders may be obtained from, for instance Wenger Manufacturing Inc, Clextral S A, Buhler A G. During passage through the extruder, the moistened feed passes through a cooking zone, in which it is subjected to mechanical shear and heat, and a forming zone. The gauge pressure in the forming zone is from about 600 kPa to about 10 MPa. If desired, water or steam, or both, may be introduced into the cooking zone. Other liquids, including humectants such as glycerol or glycol, may also be introduced into the extruder during cooking.

Further, during passage through the extruder, the starch ingredients of the moistened feed are gelatinized to provide the gelatinized starch matrix. The gelatinization of the starch is achieved by processing at elevated temperature, and controlling one or more of the cooking time, moisture and/or shear. Low moisture contents, such as those which prevail in many extrusion cookers (<ca. 30% and often <ca. 20% moisture) are generally unfavourable to starch gelatinization. Hence, many extrusion cookers rely upon the generation of a great deal of shear stress to mitigate the low moisture conditions and achieve high levels of starch gelatinisation (see "The Technology of Extrusion Cooking", N. D. Frame (Ed.). Blackie Academic and Professional, 1994, Chapter 3). Finally, the composition is forced through the extrusion die to assume a structure, comprising an outer wall and an internal support structure, of the present invention.

The degree of gelatinization of the starch may be varied to further modulate the lasting time of the chew. In certain embodiments, the animal chew may comprise a degree of gelatinization greater than 30% on total starch basis. Thus, the degree of starch gelatinization is preferably about 30 to about 100%, more preferably about 45% to about 100% and even more preferably about 70 to about 100%. In one embodiment of the present invention, the starch preferably has gelatinization levels of greater than 80%, preferably greater than 85%, preferably greater than 90%, preferably greater than 92.5%, preferably greater than 95%, preferably greater than 97.5%, preferably greater than 98%, and preferably at least 99% by weight. The use of starch with such gelatinization levels, and preferably in combination with fibre, provides further advantages in terms of lasting time. The degree of starch gelatinization may be measured according to the method disclosed in WO-2005/092087-A, the disclosure of which is incorporated herein by reference.

An animal chew may be characterised with reference to its mechanical properties. For instance, properties of animal chews can be studied by texture analysis using a Stable Micro Systems TA-HDi Texture Analyser, and in particular by studying the "6 mm probe" characteristic. In this test, the sample is laid horizontally, supported by a plate with a central hole to allow the probe to pass through, and a force is applied to the sample by a 6 mm diameter cylindrical probe which moves vertically downwards at a corresponding to the widest part of the product. In the tests described herein, the speed of this vertical downward motion is held at 1 mm/sec (so that the time in seconds and the depth of penetration in mm are numerically identical). As the probe enters the sample, the force required to maintain the downward motion at the set vertical speed is recorded by the instrument. The test data are thus plotted as force against time (sec) which, as noted above, is equivalent to force against penetration (mm).

The present invention is described in the examples below by way of illustration.

EXAMPLE 1—MANUFACTURE OF CHEWS

A series of dog chews was produced using a twin-screw cooker extruder, providing a combination of heating and mechanical shear sufficient to gelatinise at least a portion of the starch component of the recipe and to provide a microbiological kill step for the product, achieving at least a temperature of 90 degrees Celsius. The recipe comprised starch (50-75 wt %), protein (6-10 wt %), water (10-15 wt %) and a humectant (10-15 wt %, which in this example was glycerol) with additional flavours for increased palatability for the dog. The product was sufficiently tough that it maintained its shape profile after extrusion, but remained sufficient flexible to allow its shape to deform to absorb the energy of chewing without shearing. The texture of the chew according to FIG. 1 was analysed as described hereinabove, and required a force of about 20 kg to penetrate with a 6 mm steel cylindrical probe moving at 1 mm/s.

EXAMPLE 2—COMPARISON WITH PRIOR ART CHEWS

The lasting time of an animal chew of the present invention (Chew 1), as depicted in FIG. 1, was measured using 14 different dogs on up to three separate occasions to give data points. The average total eating time for the animal chew of the present invention was calculated. The average eating time for the commercially available Pedigree Jumbone® edible chew (Chew 2) was also calculated in the same manner from data points. These are compared in Table 1. Both chews had a calorie content of approximately 300 kcal per 100 g.

TABLE 1

Chew lasting time data

| | Average total eating time/s | Percentage of chews lasting over 10 minutes |
|---|---|---|
| Chew 1 | 731.5 | 62.5 |
| Chew 2 | 398.5 | 12.8 |

It can be seen that the animal chew of the present invention (Chew 1) lasts almost twice as long as the prior art chew (Chew 2). Also, it can be seen that for the majority of dogs tested the animal chews of the present invention lasted over 10 minutes, compared to the minority of prior art chews that achieved such a lasting time.

The invention claimed is:

1. An edible animal chew having a longitudinal axis, wherein the edible animal chew comprises:
   (i) an outer wall extending in the direction of said longitudinal axis, wherein the animal chew is elongate in shape;
   (ii) an internal support structure comprising inner walls and at least three struts, wherein each of the at least three struts contacts an inner surface of said outer wall wherein the inner walls and struts extend in the direction of said longitudinal axis and define a plurality of channels that extend in the direction of said longitudinal axis; and
   (iii) wherein said edible animal chew comprises a degree of starch gelatinization greater than 30% on a total starch basis.

2. The edible animal chew of claim 1, wherein said plurality of channels are coextensive with said outer wall in the direction of said longitudinal axis.

3. The edible animal chew of claim 1, wherein said plurality of channels are hollow.

4. The edible animal chew of claim 1, wherein at least three of said plurality of channels are surrounded by the internal support structure and part of said outer wall.

5. The edible animal chew of claim 1, wherein the inner walls form a transverse cross-sectional shape of a polygon or ellipse.

6. The edible animal chew of claim 5, wherein the inner walls form a transverse cross-sectional shape that is a polygon and wherein at least one strut contacts the at least one inner wall at a vertex of said polygon.

7. The edible animal chew of claim 5, wherein said transverse cross-sectional shape is a square.

8. The edible animal chew of claim 1, wherein said outer wall has a transverse cross-sectional shape of a polygon or ellipse.

9. The edible animal chew of claim 8, wherein the outer wall transverse cross-sectional shape is a polygon and the internal support structure contacts said outer wall between the vertices of said outer wall polygon.

10. The edible animal chew of claim 8, wherein said outer wall transverse cross-sectional shape is an octagon.

11. The edible animal chew of claim 1, wherein the outer wall and the internal support structure are made from the same material.

12. The edible animal chew of claim 1, which is extruded.

13. The edible animal chew of claim 1, wherein the transverse cross-section of the edible animal chew comprises at least one symmetry element.

14. The edible animal chew of claim 1, wherein the outer wall has a substantially constant wall thickness at each point around the edible animal chew.

15. The edible animal chew of claim 13, wherein the transverse cross-section of the edible animal chew comprises at least 3-fold rotational symmetry and/or at least 3 lines of reflectional symmetry.

16. The edible animal chew of claim 1, wherein the channels tessellate.

17. An edible animal chew having an elongate geometry defining a longitudinal axis, wherein the edible animal chew comprises:
   (i) an outer wall extending in the direction of said longitudinal axis;
   (ii) an internal support structure comprising inner walls and at least three struts, wherein each of the at least three struts contacts an inner surface of said outer wall wherein the internal support structure defines a plurality of channels that extend in the direction of said longitudinal axis;
   (iii) less than 30% by weight fibre; and
   (iv) from 4% to 9% by weight fat,
wherein said edible animal chew comprises a degree of starch gelatinization greater than 30% on a total starch basis.

18. The edible pet chew of claim 17, wherein said fibre is insoluble fibre.

19. The edible pet chew of claim 17, wherein said fibre is dispersed in the gelatinized starch.

20. An edible animal chew having an elongate geometry defining a longitudinal axis, wherein the edible animal chew comprises:
   (i) an outer wall extending in the direction of said longitudinal axis, wherein the outer wall has a substantially constant wall thickness at each point around the edible animal chew; and
   (ii) an internal support structure comprising inner walls and at least three struts, wherein each of the at least three struts join a vertice of an inner wall to an inner surface of said outer wall between vertices of the outer wall, the at least one inner wall and struts extending in the direction of said longitudinal axis.

* * * * *